(12) United States Patent
Savagaonkar et al.

(10) Patent No.: US 7,624,242 B2
(45) Date of Patent: Nov. 24, 2009

(54) OPERATING SYSTEM AGNOSTIC SHARING OF PROTECED MEMORY USING MEMORY IDENTIFIERS

(75) Inventors: Uday Savagaonkar, Beaverton, OR (US); Ravi Sahita, Beaverton, OR (US); Hormuzd Khosravi, Portland, OR (US); Priya Rajagopal, Shewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 517 days.

(21) Appl. No.: 11/394,844

(22) Filed: Mar. 31, 2006

(65) Prior Publication Data
US 2007/0239953 A1   Oct. 11, 2007

(51) Int. Cl.
*G06F 12/14* (2006.01)
(52) U.S. Cl. .............................. 711/163; 711/E12.091; 711/E12.096; 726/27
(58) Field of Classification Search .................. 711/163, 711/170, E12.096, E12.091; 726/26
See application file for complete search history.

(56) References Cited

U.S. PATENT DOCUMENTS

| | | | | |
|---|---|---|---|---|
| 5,737,760 A | * | 4/1998 | Grimmer et al. | 711/163 |
| 5,812,767 A | * | 9/1998 | Desai et al. | 709/250 |
| 7,139,894 B1 | * | 11/2006 | Mensching et al. | 711/E12.096 |
| 2004/0133734 A1 | * | 7/2004 | Jordan et al. | 711/163 |
| 2006/0009695 A1 | * | 1/2006 | Mathew et al. | 600/437 |
| 2006/0155774 A1 | * | 7/2006 | Sachedina et al. | 707/200 |
| 2007/0239985 A1 | * | 10/2007 | Bernabeu-Auban et al. | 713/168 |

\* cited by examiner

*Primary Examiner*—Matt Kim
*Assistant Examiner*—Michael C Krofcheck
(74) *Attorney, Agent, or Firm*—Blakely, Sokoloff, Taylor & Zafman LLP

(57) ABSTRACT

An embodiment of the present invention is a technique to protect memory. A memory identifiers storage stores memory identifiers associated with protected components. The memory identifiers include exclusive memory identifiers and shared memory identifiers. The memory identifier storage is protected from access by a host operating system. A memory identifier management service (MMS) manages the memory identifiers. The MMS resides in a protected environment. An access control enforcer (ACE) enforces an access control policy with the memory identifiers.

30 Claims, 12 Drawing Sheets

OPERATING SYSTEM AGNOSTIC SHARING OF PROTECED MEMORY USING MEMORY IDENTIFIERS

BACKGROUND

1. Field of the Invention

Embodiments of the invention relate to the field of microprocessors, and more specifically, to memory protection in microprocessor.

2. Description of Related Art

Security threats of microprocessor systems have become more and more alarming. A single virus or worm may cause significant damage to a business or an enterprise.

Many security measures have been developed to protect a microprocessor system from being invaded by malicious attack. One technique uses the execute disable bit in the page table entry headers to prevent certain classes of malicious buffer overflow attacks. This technique, however, may not protect against malware that uses other mechanisms to compromise the system. For example, it may not protect an inadvertent user from installing a malware at kernel privilege levels which may compromise other critical components.

BRIEF DESCRIPTION OF THE DRAWINGS

Embodiments of invention may best be understood by referring to the following description and accompanying drawings that are used to illustrate embodiments of the invention. In the drawings.

DESCRIPTION

Figure 1A:
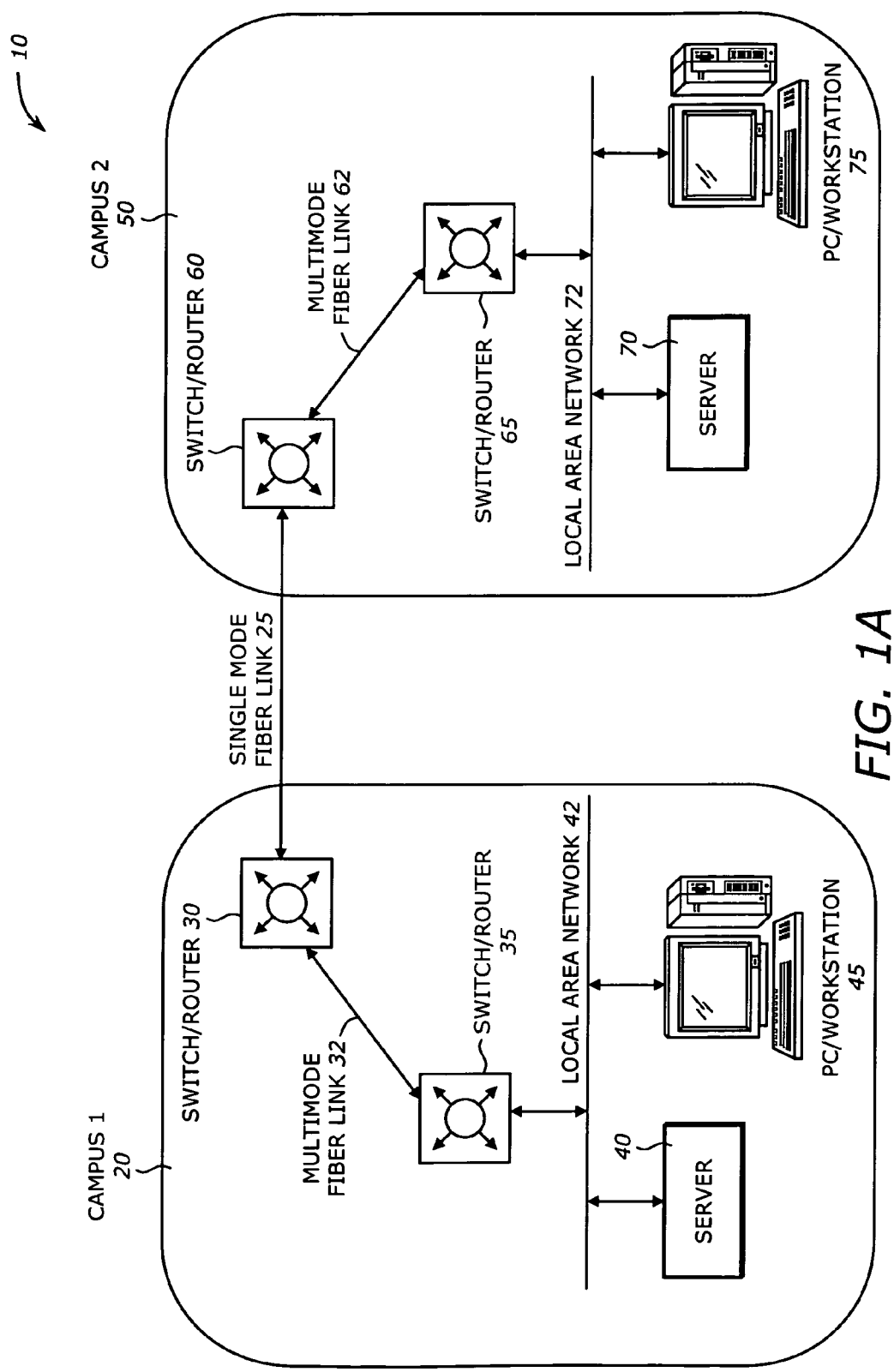
FIG. 1A is a diagram illustrating a network system in which one embodiment of the invention can be practiced.

An embodiment of the present invention is a technique to protect memory using unique identifiers, called memory identifiers. A memory identifier storage stores memory identifiers associated with protected critical components. The memory identifiers include exclusive memory identifiers and shared memory identifiers. The memory identifier storage is protected from access by a host operating system. A memory identifier management service (MMS) manages the memory identifiers. The MMS resides in a protected environment. An access control enforcer (ACE) enforces an access control policy with the memory identifiers.

In the following description, numerous specific details are set forth. However, it is understood that embodiments of the invention may be practiced without these specific details. In other instances, well-known circuits, structures, and techniques have not been shown to avoid obscuring the understanding of this description.

One embodiment of the invention may be described as a process, which is usually depicted as a flowchart, a flow diagram, a structure diagram, or a block diagram. Although a flowchart may describe the operations as a sequential process, many of the operations can be performed in parallel or concurrently. A loop or iterations in a flowchart may be described by a single iteration. It is understood that a loop index or loop indices or counter or counters are maintained to update the associated counters or pointers. In addition, the order of the operations may be re-arranged. A process terminates when its operations are completed. A process may correspond to a method, a program, a procedure, etc. A block diagram may contain blocks or modules that describe an element, an item, a component, a device, a unit, a subunit, a structure, a method, a process, a function, an operation, a functionality, or a task, etc. A functionality or an operation may be performed automatically or manually.

In the following, the term "component" may refer to a software component or a hardware component. A software component may refer to a function, a program, a module, a method, a driver, etc. A software component may be coupled or linked to another software, firmware, or hardware component. A hardware component may refer to a logic circuit, a functional unit, etc. A kernel component refers to a component operating at the kernel level such as the supervisor level. A critical component refers to a component that is critical to the system. It may be a software component, a kernel component, a hardware component, or any component that is critical to the operation of the system, and needs protection from malicious attacks.

One embodiment of the invention is a technique to protect code and data segments of critical components from malicious attacks using identifiers called memory identifiers. The technique is an operating system agnostic sharing of protected memory using memory identifiers. A memory identifier is used to identify memory pages associated with the critical component. Each physical page may have a unique memory identifier. Three types of memory identifiers may be used: unprotected, exclusive, and shared. The shared memory identifiers allow different critical components share memory pages in a protected manner. To access a memory page having a shared memory identifier, a requesting agent presents credentials to prove that it has the access privilege. If the credentials satisfy or match credential requirements set by the owner of the shared memory identifier, access is allowed. Otherwise, the access is denied. The shared memory pages in a protected environment may be used to pass information from one component to another. Such sharing allows privileged code to be chained together in a chain-of-trust model. The technique has numerous applications. For example, the technique may be used to ensure that only packets that traverse a firewall or a virtual private network (VPN) intermediate driver are delivered to the device driver. This is especially useful to prevent circumvention of security software by network traffic leaving or entering the system.

FIG. 1A is a diagram illustrating a network system 10 in which one embodiment of the invention can be practiced. The network system 10 represents a Local Area Network (LAN) applications using 10 Gigabit Ethernet. The system 10 includes two campuses 20 and 50 and link 25.

Each of the campuses 20 and 50 represents an enterprise using network interconnections to link personal computers (PCs), workstations, and servers. They may have aggregation of multiple 1000BASE-X or 1000BASE-T segments into 10 Gigabit Ethernet downlinks. The link 25 may be a single mode fiber link that connects the two campuses 20 and 50 over a long distance (e.g., 40 km).

Campuses 20 and 50 may be similar in their infrastructure. The network in each campus may encompass buildings, data centers, or computer rooms. The campus 20 may include switches/routers, such as switch/router 30 and switch/router 35, and a LAN 42. The campus 50 may include switches/routers, such as switch/router 60 and switch/router 65, and a LAN 72. Switch/routers 30 and 60 are typically located at the edge of the corresponding campuses. They are connected together via the link 25. Switches/routers 30 and 35 are connected via a multimode fiber link 32 over shorter distances (e.g., 30-80 meters) at speed of up to 10 Gigabits per second (Gbps). The switch/router 35 is connected to the LAN 42. Similarly, switches/routers 60 and 65 are connected via a multimode fiber link 62 over shorter distances (e.g., 30-80 meters) at speed of up to 10 Gigabits per second (Gbps). The switch/router 65 is connected to the LAN 72.

The LAN 42 provides connectivity to servers, PCs, or workstations, such as a server 40 and a personal computer (PC)/workstation 45. Similarly, the LAN 72 provides network connectivity to servers, PCs, or workstations, such as a server 70 and a PC/workstation 75. The server 40 or 70 provides specific operations to support the computing environment. They may be a print server connected to a variety of printers, a storage server connected to mass storage devices such as tape drive, redundant arrays of inexpensive disks (RAIDs), a media server to provide multimedia services such as video, audio, or graphics, or any server with specific functions. Each server typically includes one or more network interface cards (NICs) with network connectivity to the corresponding LAN. The PC/workstation 45 or 75 may be a processing system running in a memory protected environment.

Figure 1B:
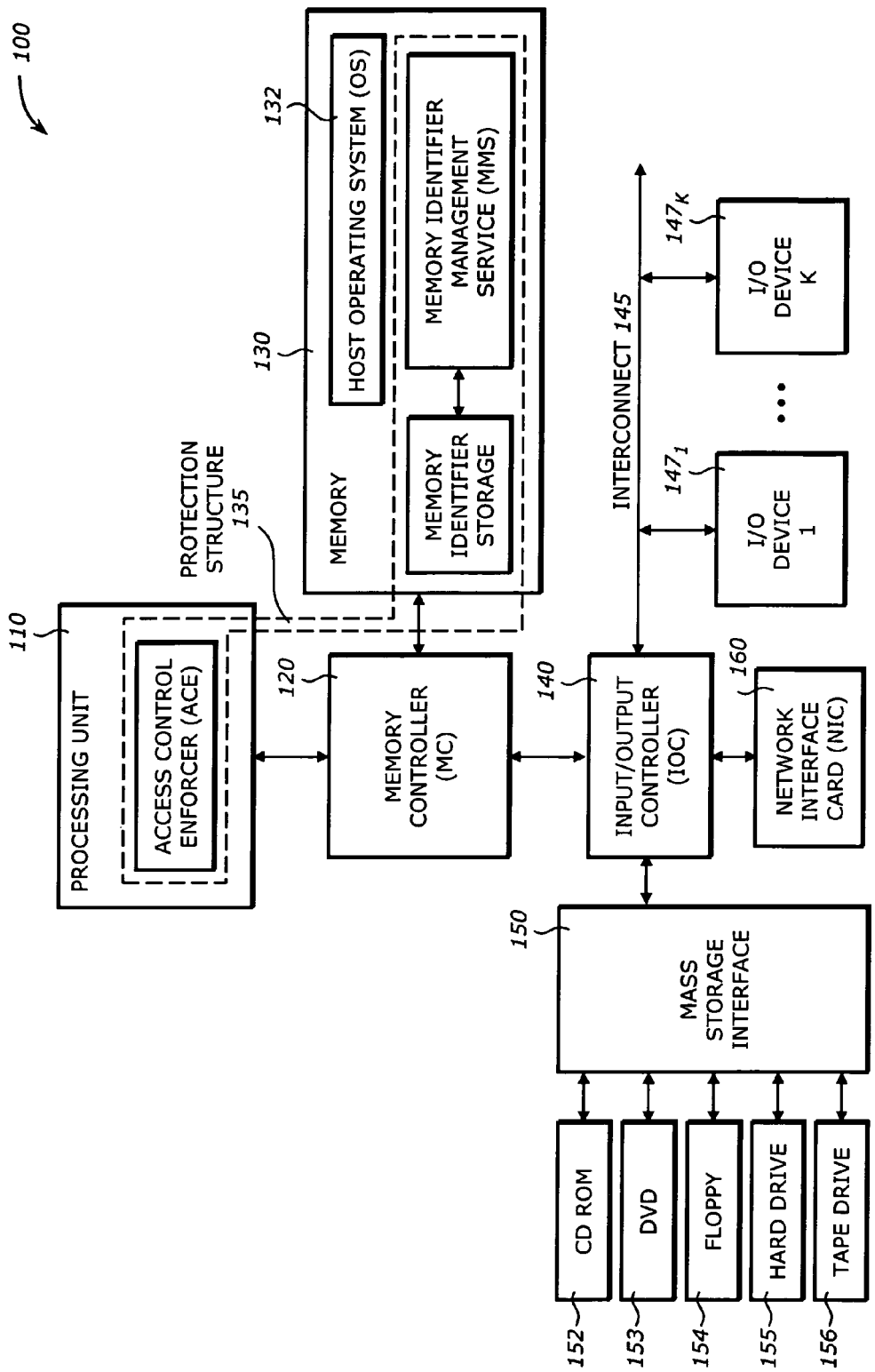
FIG. 1B is a diagram illustrating a processing system in which one embodiment of the invention can be practiced.

FIG. 1B is a diagram illustrating the processing system 45/75 in which one embodiment of the invention can be practiced. The system 45/75 may be a platform, a unit, a fully or partly configured system. It includes a processor unit 110, a memory controller (MC) 120, a main memory 130, an input/output controller (IOC) 140, an interconnect 145, a mass storage interface 150, input/output (I/O) devices 147$_1$ to 147$_K$, and a network interface card (NIC) 160.

The processor unit 110 represents a central processing unit of any type of architecture, such as processors using hyper threading, security, network, digital media technologies, single-core processors, multi-core processors, embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture. The processor unit 110 may include a portion of a protection structure 135. The protection structure 135 includes hardware, software, firmware, or any combination thereof, components to protect memory pages.

The MC 120 provides control and configuration of memory and input/output devices such as the main memory 130 and the IOC 140. The MC 120 may be integrated into a chipset that integrates multiple functionalities such as graphics, media, isolated execution mode, host-to-peripheral bus interface, memory control, power management, etc. The MC 120 or the memory controller functionality in the MC 120 may be integrated in the processor unit 110. In some embodiments, the memory controller, either internal or external to the processor unit 110, may work for all cores or processors in the processor unit 110. In other embodiments, it may include different portions that may work separately for different cores or processors in the processor unit 110.

The main memory 130 stores system code and data. The main memory 130 is typically implemented with dynamic random access memory (DRAM), static random access memory (SRAM), or any other types of memories including those that do not need to be refreshed. The main memory 130 may include multiple channels of memory devices such as DRAMs. The DRAMs may include Double Data Rate (DDR2) devices. In one embodiment, the memory 130 includes a host operating system (OS) 132, and a portion or a complete protection structure 135. As discussed above, the protection structure 135 may be implemented by any combination of hardware, software, or firmware components.

The IOC 140 has a number of functionalities that are designed to support I/O functions. The IOC 140 may also be integrated into a chipset together or separate from the MC 120 to perform I/O functions. The IOC 140 may include a number of interface and I/O functions such as peripheral component interconnect (PCI) bus interface, processor interface, interrupt controller, direct memory access (DMA) controller, power management logic, timer, system management bus (SMBus), universal serial bus (USB) interface, mass storage interface, low pin count (LPC) interface, wireless interconnect, direct media interface (DMI), etc. The IOC 140 is coupled to the processor unit 110 to establish a connection for packet communication to the network via the NIC 160.

The interconnect 145 provides interface to peripheral devices. The interconnect 145 may be point-to-point or connected to multiple devices. For clarity, not all interconnects are shown. It is contemplated that the interconnect 145 may include any interconnect or bus such as Peripheral Component Interconnect (PCI), PCI Express, Universal Serial Bus (USB), Small Computer System Interface (SCSI), serial SCSI, and Direct Media Interface (DMI), etc.

The mass storage interface 150 interfaces to mass storage devices to store archive information such as code, programs, files, data, and applications. The mass storage interface may include SCSI, serial SCSI, Advanced Technology Attachment (ATA) (parallel and/or serial), Integrated Drive Electronics (IDE), enhanced IDE, ATA Packet Interface (ATAPI), etc. The mass storage device may include compact disk (CD) read-only memory (ROM) 152, digital video/versatile disc (DVD) 153, floppy drive 154, and hard drive 155, tape drive 156, and any other magnetic or optic storage devices. The mass storage device provides a mechanism to read machine-accessible media.

The I/O devices $147_1$ to $147_K$ may include any I/O devices to perform I/O functions. Examples of I/O devices $147_1$ to $147_K$ include controller for input devices (e.g., keyboard, mouse, trackball, pointing device), media card (e.g., audio, video, graphic), and any other peripheral controllers.

The NIC 160 provides network connectivity to the server 40/70. In one embodiment, the NIC 160 is compatible with both 32-bit and 64-bit peripheral component interconnect (PCI) bus standards. It is typically compliant with PCI local bus revision 2.2, PCI-X local bus revision 1.0, or PCI-Express standards. There may be more than one NIC 160 in the processing system. Typically, the NIC 160 supports standard Ethernet minimum and maximum frame sizes (64 to 1518 bytes), frame format, and Institute of Electronics and Electrical Engineers (IEEE) 802.2 Local Link Control (LLC) specifications. It may also support full-duplex Gigabit Ethernet interface, frame-based flow control, and other standards defining the physical layer and data link layer of wired Ethernet. It may support copper Gigabit Ethernet defined by IEEE 802.3ab or fiber-optic Gigabit Ethernet defined by IEEE 802.3z.

The NIC 160 may also be a host bus adapter (HBA) such as a Small System Small Interface (SCSI) host adapter or a Fiber Channel (FC) host adapter. The SCSI host adapter may contain hardware and firmware on board to execute SCSI transactions or an adapter Basic Input/Output System (BIOS) to boot from a SCSI device or configure the SCSI host adapter. The FC host adapter may be used to interface to a Fiber Channel bus. It may operate at high speed (e.g., 2 Gbps) with auto speed negotiation with 1 Gbps Fiber Channel Storage Area Network (SANs). It may be supported by appropriate firmware or software to provide discovery, reporting, and management of local and remote HBAs with both in-band FC or out-of-band Internet Protocol (IP) support. It may have frame level multiplexing and out of order frame reassembly, on-board context cache for fabric support, and end-to-end data protection with hardware parity and cyclic redundancy code (CRC) support.

Figure 2:
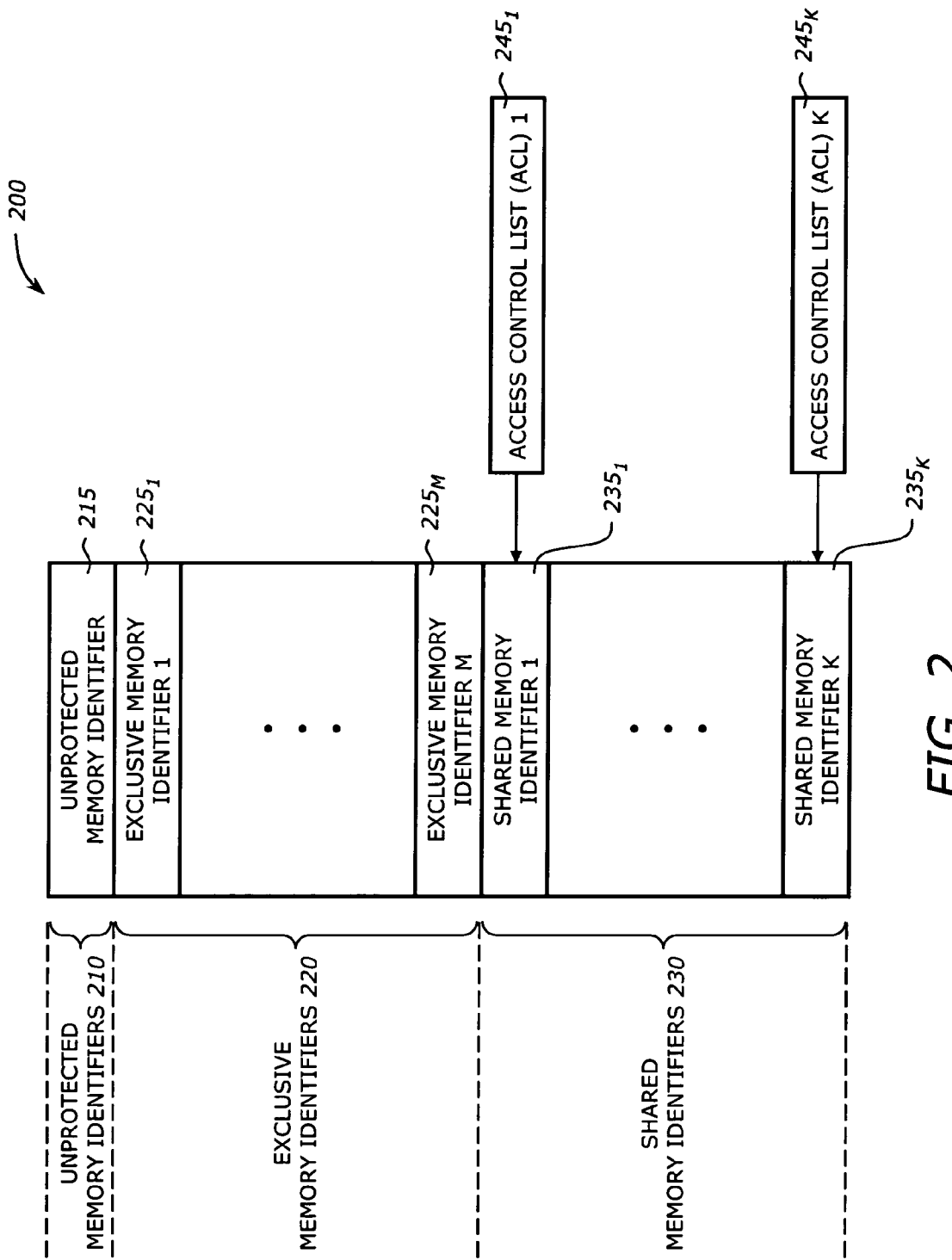
FIG. 2 is a diagram illustrating a memory identifier structure according to one embodiment of the invention.

FIG. 2 is a diagram illustrating a memory identifier structure 200 according to one embodiment of the invention. The memory identifier structure 200 includes unprotected memory identifiers 210, exclusive memory identifiers 220, and shared memory identifiers 230. The memory identifiers are identified by an identifier. The size of the identifier determines the number of memory identifiers. For example, an N-bit identifier may identify $2^N$ different memory identifiers.

The unprotected memory identifiers 210 correspond to unprotected critical components. Typically, the unprotected memory identifiers 210 include a single unprotected memory identifier 215 corresponding to the zero identifier, referred to as memory identifier 0. Non-zero memory identifiers correspond to protected critical components, which include the exclusive memory identifiers 220 and the shared memory identifiers 230.

The exclusive memory identifiers 220 correspond to exclusive critical components. For example, if a memory page belongs to an exclusive memory identifier, then only the critical component owning that memory identifier is allowed to access to the memory page or transfer execution control to that memory page. The exclusive memory identifiers 220 include M exclusive memory identifiers $225_1$ to $225_M$.

The shared memory identifiers 230 correspond to shared critical components. Multiple shared components may share protected memory pages. An owner of a shared memory identifier may set credential requirements to allow access to the associated memory pages. The shared memory identifiers 230 include K shared memory identifiers $235_1$ to $235_M$. Each of the shared memory identifiers is associated with an access control list (ACL). The shared memory identifiers $235_1$ to $235_M$ are associated with K ACLs $245_1$ to $245_K$, respectively. The ACLs $245_1$ to $245_K$ are maintained for the shared memory identifiers $235_1$ to $235_M$ to represent which memory identifiers are allowed access to the pages having the corresponding shared memory identifiers.

Figure 3:
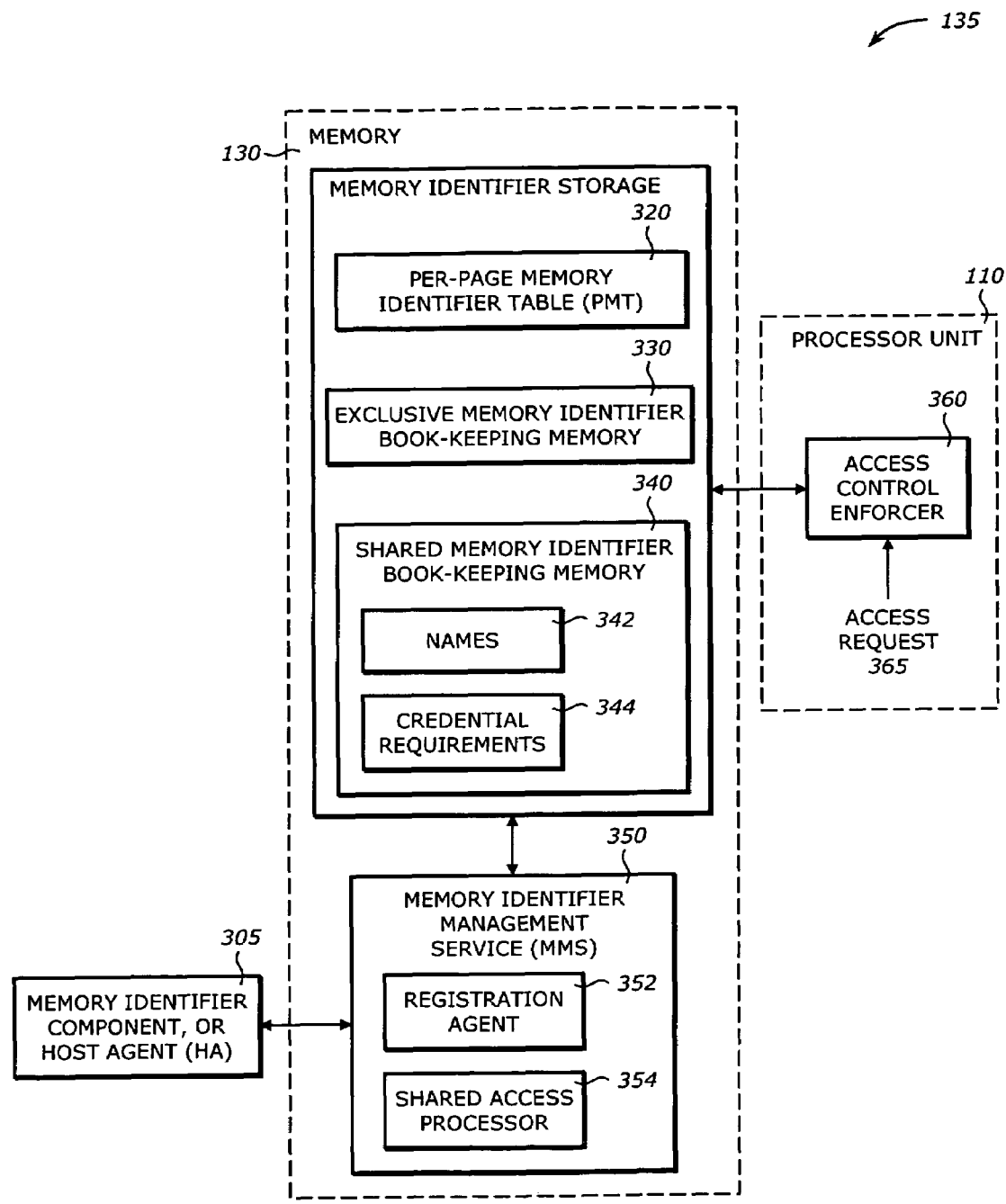
FIG. 3 is a diagram illustrating a protection structure according to one embodiment of the invention.

FIG. 3 is a diagram illustrating the protection mechanism or structure 135 according to one embodiment of the invention. The protection structure 135 includes a memory identifier storage 310, a memory identifier management service (MMS) 350, and an access control enforcer (ACE) 360. Any one of these elements may be implemented by hardware, software, firmware, or any combination thereof. In one embodiment, the memory identifier storage 310 and the MMS 350 are in the memory 130 (FIG. 1), and the ACE 360 is implemented as a logic circuit in the processor unit 110 (FIG. 1).

The memory identifier storage 310 stores memory identifiers associated with protected components. The memory identifiers include exclusive memory identifiers and shared memory identifiers. The memory identifiers storage 310 is protected from access by the host operating system 132. The memory identifiers storage 310 includes a per-page memory identifier table (PMT) 320, an exclusive memory identifier book-keeping memory 330, and a shared memory identifier book-keeping memory 340.

The PMT 320 stores memory identifiers associated with physical memory pages. The exclusive memory identifier book-keeping memory 330 maintains state information for each of the exclusive memory identifiers. The shared memory identifier book-keeping memory 340 stores access control information and credential requirements for the shared memory identifiers. It includes storage of names 342 and credential requirements 344. The names are unique name identifiers for shared memory identifiers. The credential requirements 344 may include at least one of an asymmetric key credential, a pointer to a handler, and a hash signature of the critical component.

The MMS 350 manages the memory identifiers. It typically resides in a protected execution or tamper resistant environment, such as a service processor or as a System Management Mode (SMM) module. The MMS includes a registration agent 352 and a shared access processor 356. The functionalities of the registration agent 352 and the shared access processor 356 may be separate or combined.

The registration agent 352 performs a number of operations during a registration procedure to register a critical component or a host agent (HA) 305. The HA 305 may be a registering component or a registered component. A registering component is a component that has not been registered for an exclusive memory identifier. A registered component is a component that has been assigned an exclusive memory identifier. The registration agent 352 performs two registration procedures for the HA 305:

Registration for exclusive memory identifiers: In this registration, the HA 305 has not been assigned or registered for an exclusive memory identifier. The HA 305 requests for an exclusive memory identifier. The registration agent 352 obtains an available exclusive memory identifier and assigns it to the registering HA 305. The registration agent 305 then modifies the PMT 320 to mark memory pages submitted by the registering HA 305 with the assigned exclusive.

Registering for shared memory identifiers: In this registration, the HA 305 has been assigned an exclusive memory identifier, and now wishes to be assigned a shared memory identifier. The registration agent 305 obtains an available shared memory identifier and assigns it to the registered HA 305 upon receiving a request having a unique name and credential requirements from the registered HA 305.

The registration agent 352 may also add the registered component to an ACL of the assigned shared memory identifier as an owner, store the credential requirements in the shared memory identifiers book-keeping memory, and modify the PMT to mark memory pages submitted by the registered component with the assigned shared memory identifier.

The shared access processor 354 processes a request from a requestor to access the shared memory identifier using name and credentials provided by the requestor. The shared access processor 354 determines if the credentials submitted by the requestor match or satisfy the credential requirements as set by the owner during the registration process for shared memory identifiers. If there is a match, it may then add the requestor to the ACL with privileges as allowed by the credential requirements.

The ACE 360 enforces an access control policy with the memory identifiers. It may be an entity in the platform designated to enforce the access control policy (e.g., the MC 120 shown in FIG. 1B). It may be implemented in the processor unit 110 (FIG. 1B). The ACE 360 is capable of monitoring all the memory accesses, including jump (JMP) accesses. It is aware of the memory identifier associated with the instruction from which the access is originated. The ACE 360 may determine if an access request to a memory page protected by the shared memory identifier is allowed. The ACE 360 may retrieve a memory identifier associated with an instruction from which the access request is originated. It then uses the ACL associated with a target shared memory identifier to check if the requested type of access is allowed.

Figure 4:
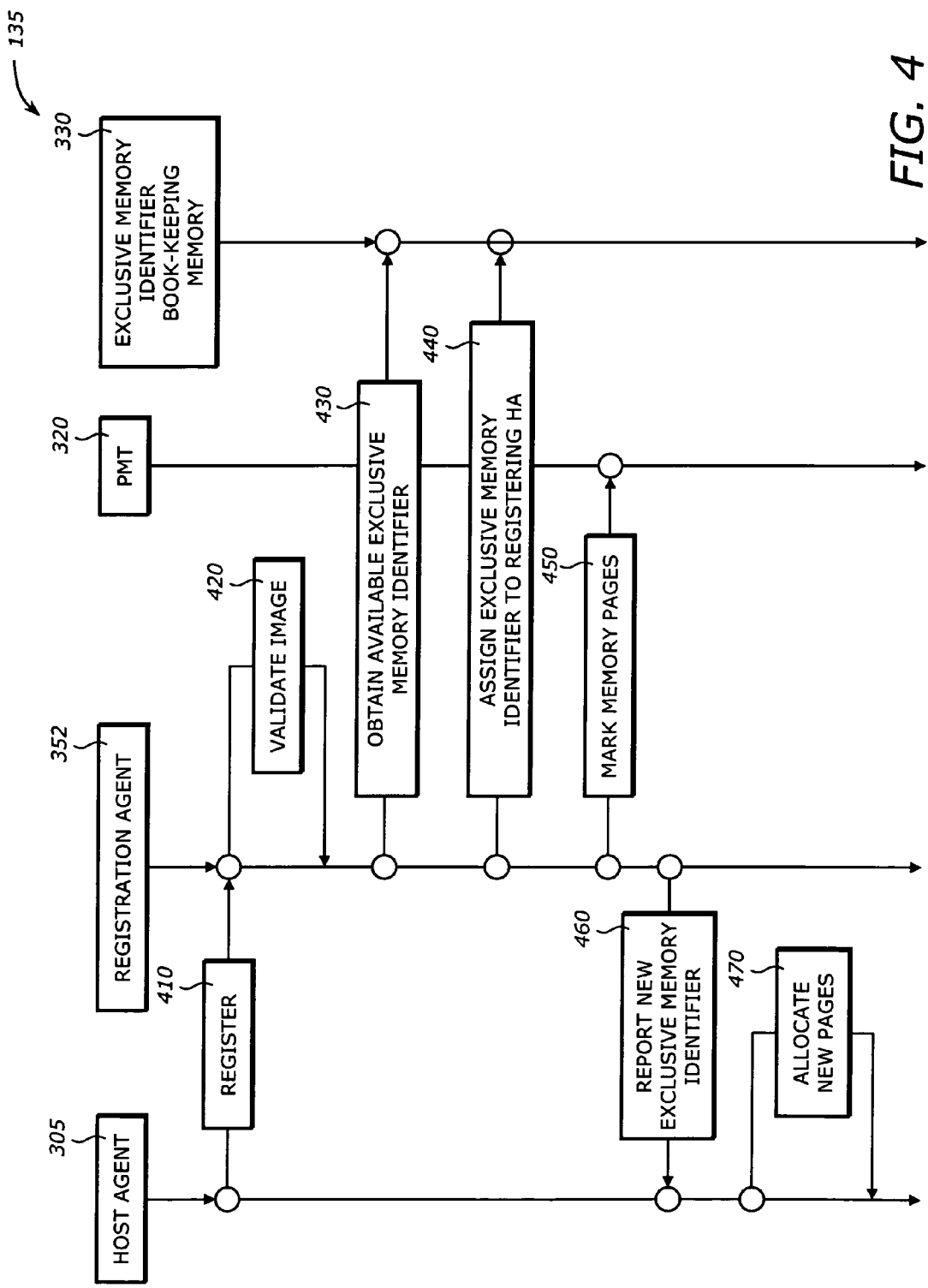
FIG. 4 is a diagram illustrating a sequence of assigning an exclusive memory identifier according to one embodiment of the invention.

FIG. 4 is a diagram illustrating a sequence 400 of assigning an exclusive memory identifier according to one embodiment of the invention. The sequence 400 involves the host agent 305, the registration agent 352, the PMT 320, and the exclusive memory identifier book-keeping memory 330.

The host agent (HA) 305 may be any critical component that requires memory identifier based protection and/or protected sharing. To receive the service, the HA 305 first registers with the protection structure 135. The host agent 305, as a registering component, requests to register to the registration agent 352 (Block 410). The registration agent 352 may validate the image to confirm validity of the host agent 305 (Block 420). After the image has been validated, the registration agent 352 obtains a free or available exclusive memory identifier in the exclusive memory identifier book-keeping memory 330 (Block 430). Then, the registration agent 352 assigns the exclusive memory identifier to the registering HA 305 as the available memory identifier (Block 440).

Next, the registration agent 352 marks the registered memory page(s) in the PMT 320 to indicate that these pages belong to the newly allocated or assigned exclusive memory identifier (Block 450). Then, the registration agent 352 reports the new exclusive micro-content identifier to the registering HA 305 (Block 460). Upon receiving the report or the notification, the registering HA 305 may allocate additional new pages having the associated assigned exclusive memory identifier (Block 470). The assignment of an exclusive memory identifier is then completed.

Figure 5:
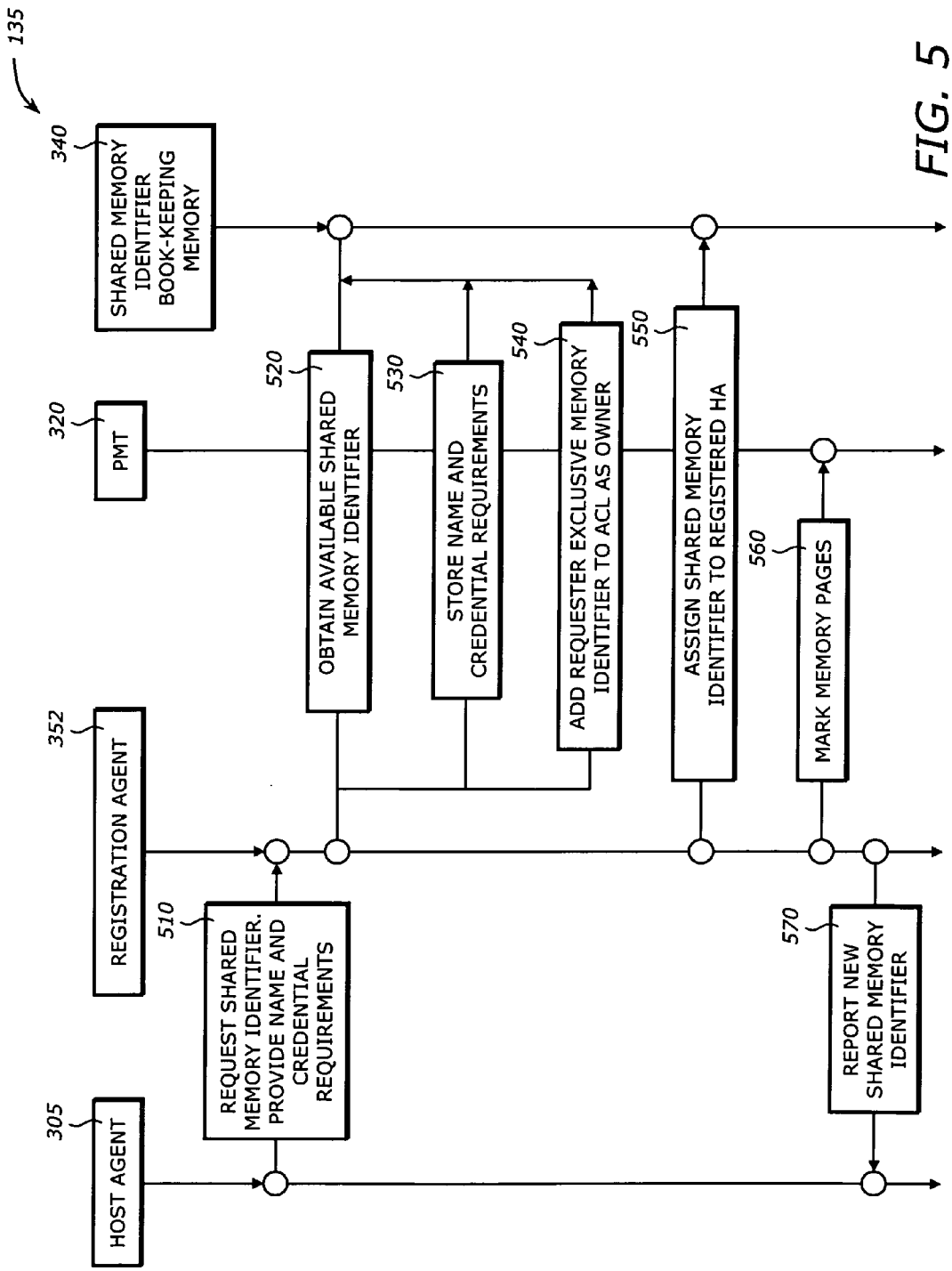
FIG. 5 is a diagram illustrating a sequence of assigning a shared memory identifier according to one embodiment of the invention.

FIG. 5 is a diagram illustrating a sequence 500 of assigning a shared memory identifier according to one embodiment of the invention. The sequence 500 involves the host agent 305, the registration agent 352, the PMT 320, and the shared memory identifier book-keeping memory 340.

The HA 305 is a registered component, i.e., it has registered for the service and has been assigned an exclusive memory identifier. It is now requesting to have shared memory identifier. The registered HA 305 sends a request for a shared memory identifier (block 510). It provides a unique name and credential requirements to the registration agent 352. The name may be known and used by other components that have the shared access privilege. The names may be generated by any suitable method. For example, they may be hard-coded into the driver code. Alternatively, they may be generated using an algorithm. The credential requirements include a set of credentials that have to be matched by credentials provided by another critical component before the other critical component is allowed to share the shared memory identifier. The credential requirements may include at least one of a public key credential, a pointer to a handler, and a hash signature of the critical component. In the public key based method, any component whose integrity may be verified using the provided public key may be allowed to access the shared memory identifier. There may be multiple public keys, each having a different set of privileges. In the handler method, the shared memory identifier may provide a pointer to a handler that is invoked whenever some other component needs to access the shared memory identifier. In the hash signature method, the creator or the owner of the shared memory identifier may specify the hash signatures of the components that are allowed to access the shared memory identifiers.

Then, the registration agent 352 obtains a free or available shared memory identifier in the shared memory identifier book-keeping memory 340 (Block 520). The registration agent 352 then stores the name and the credential requirements in the shared memory identifier book-keeping memory 340 (Block 530). The registration agent 352 next adds the registered HA or the requestor to the ACL associated with the available shared memory identifier to be assigned as the owner (Block 540). The registration agent 352 then assigns the available shared memory identifier to the registered HA 305 (Block 550). Next, the registration agent 352 marks the memory pages in the PMT 320 with the newly assigned shared memory identifier (Block 560). Finally, the registration agent 352 reports the newly allocated or assigned shared memory identifier to the registered HA 305 (Block 570). The assignment of the shared memory identifier to a registered component is then completed.

Figure 6:
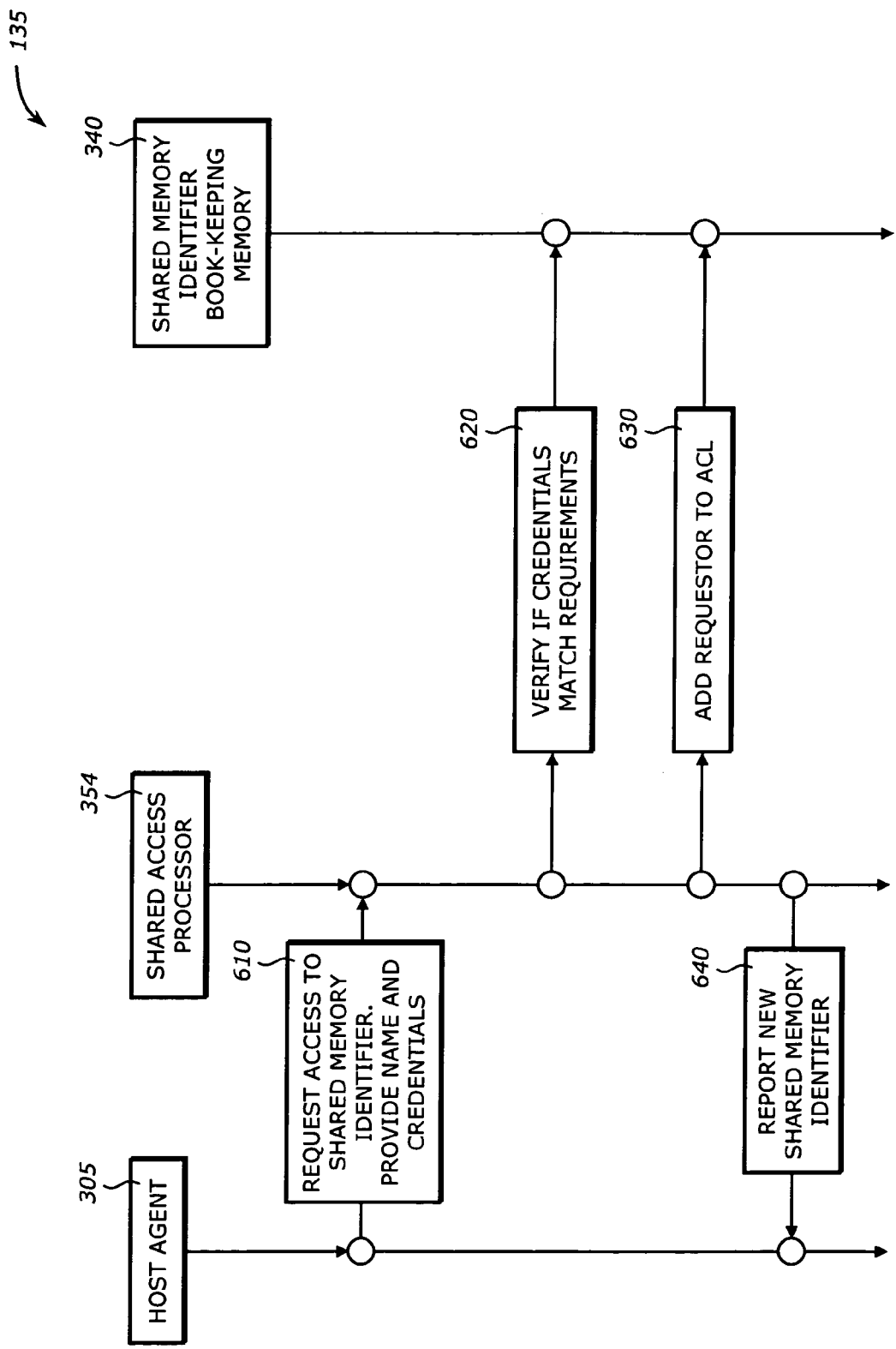
FIG. 6 is a diagram illustrating a sequence of processing an access request according to one embodiment of the invention.

FIG. 6 is a diagram illustrating a sequence 600 of processing an access request according to one embodiment of the invention. The sequence 600 involves the host agent 305, the shared access processor 354, and the shared memory identifier book-keeping memory 340.

The HA 305 is any registered component that wishes to request access to an already allocated shared memory identifier. It first requests access to a shared memory identifier (Block 610). As part of this request, the HA 305 provides the name that the creator has created for the shared memory identifier and the credentials proving that it is allowed to access the shared memory identifier. The shared access processor 354 matches the credentials provided by the HA 305 with the credential requirements associated with the requested shared memory identifier in the shared memory identifier book-keeping memory 340. The shared access processor 354 verifies that the presented credentials match the credential requirements (Block 620). If the presented credentials do not match the credential requirements, the shared access processor 354 reports to the requesting HA 305 that the request is denied. If the presented credentials match the credential requirements, the shared access processor 354 adds the exclusive memory identifier of the requester, i.e., the exclusive memory identifier of the requesting HA 305, to the ACL associated with the requested shared memory identifier (Block 630). Then, the shared access processor 354 reports the new shared memory identifier to the requesting HA 305 (Block 640). This notifies the requesting HA 305 that the request is successful. The request processing is then completed.

Figure 7:
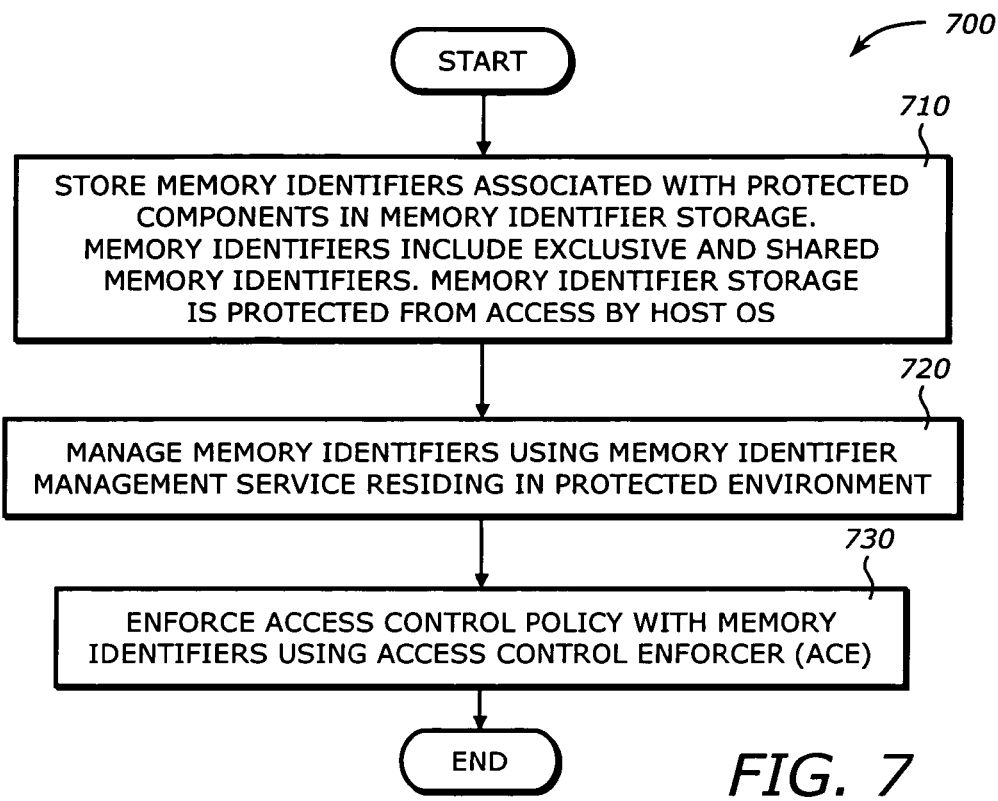
FIG. 7 is a flowchart illustrating a process to protect memory according to one embodiment of the invention.

FIG. 7 is a flowchart illustrating a process 700 to protect memory according to one embodiment of the invention.

Upon START, the process 700 stores memory identifiers associated with protected components in a memory identifier storage (Block 710). The memory identifiers include exclusive memory identifiers and shared memory identifiers. The memory identifier storage is protected from access by a host operating system. Next, the process 700 manages the memory identifiers using a memory identifier management service (MMS) (Block 720). The MMS resides in a protected environment. Then, the process 700 enforces an access control policy with the memory identifiers using an access control enforcer (ACE). The process 700 is then terminated.

Figure 8:
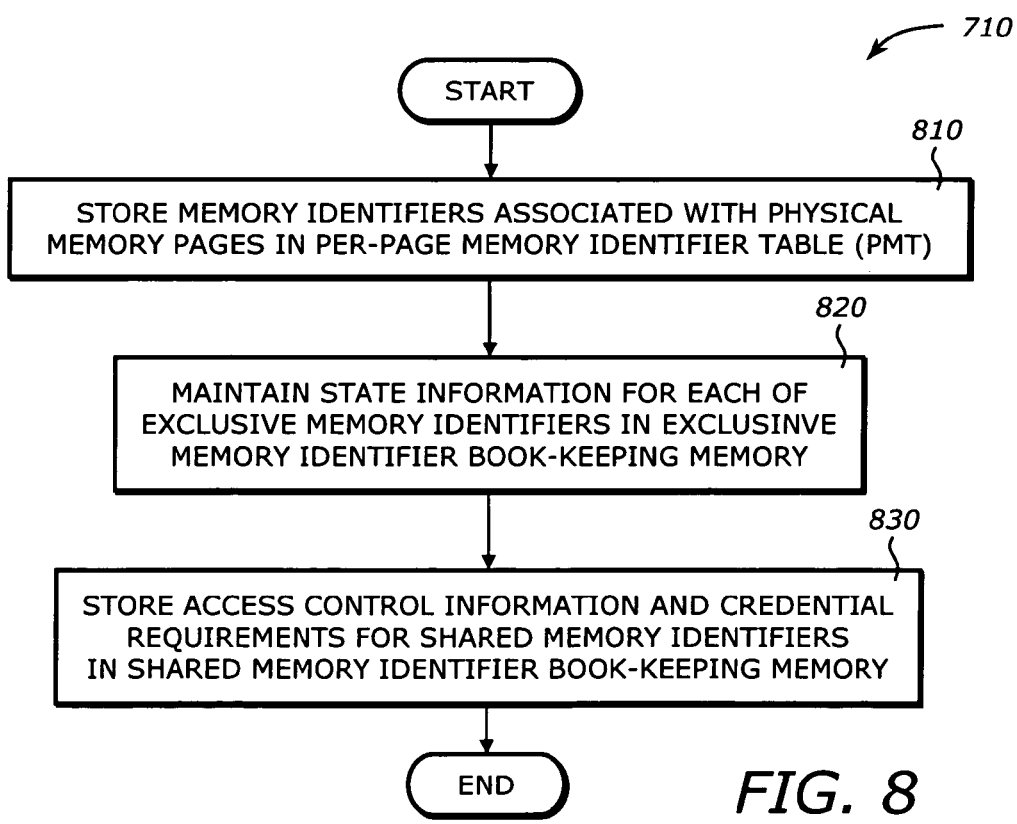
FIG. 8 is a flowchart illustrating a process to store the memory identifiers according to one embodiment of the invention.

FIG. 8 is a flowchart illustrating the process 710 shown in FIG. 7 to store the memory identifiers according to one embodiment of the invention.

Upon START, the process 710 stores memory identifiers associated with physical memory pages in a per-page memory identifier table (PMT) (Block 810). Then, the process 710 maintains state information for each of the exclusive memory identifiers in an exclusive memory identifier book-keeping memory (Block 820). Next, the process 710 stores access control information and credential requirements for the shared memory identifiers in a shared memory identifier book-keeping memory (Block 830). The process 710 is then terminated.

Figure 9:
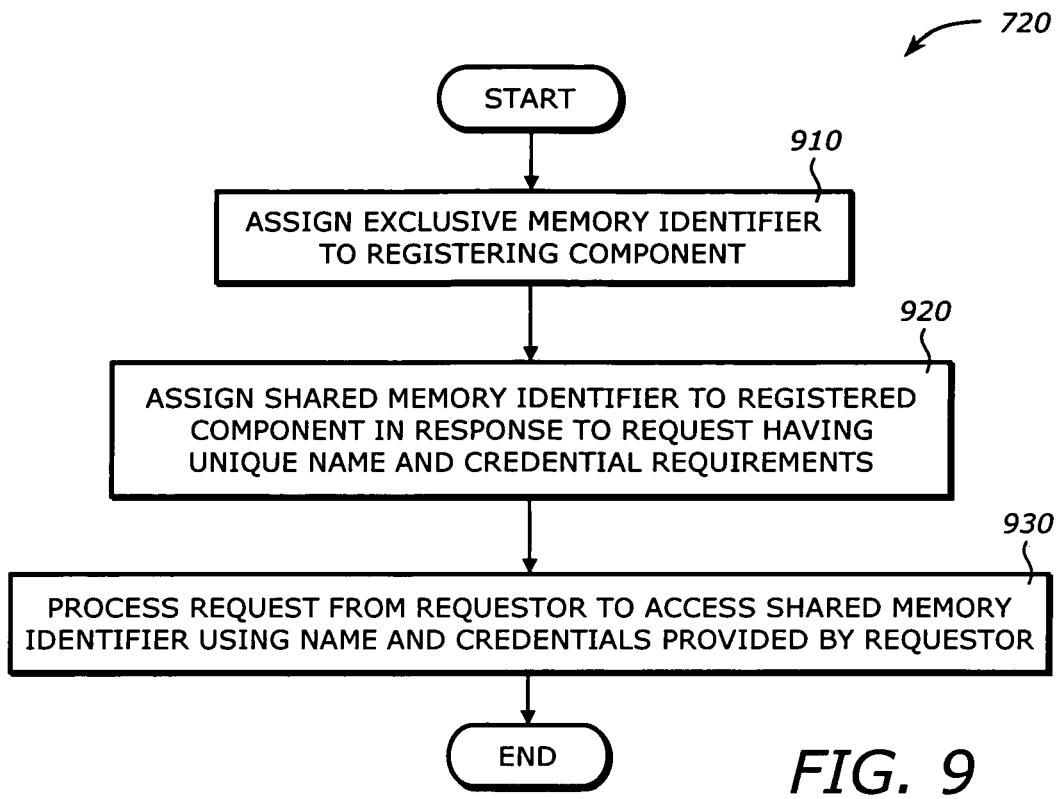
FIG. 9 is a flowchart illustrating a process to manage the memory identifiers according to one embodiment of the invention.

FIG. 9 is a flowchart illustrating the process 720 shown in FIG. 7 to manage the memory identifiers according to one embodiment of the invention.

Upon START, the process 720 assigns an exclusive memory identifier to a registering component (Block 910). Next, the process 720 assigns a shared memory identifier to a registered component in response to a request having a unique name and credential requirements (Block 920). Then, the process 720 processes a request from a requestor to access the shared memory identifier using name and credentials provided by the requestor (Block 930). The process 720 is then terminated.

Figure 10A:
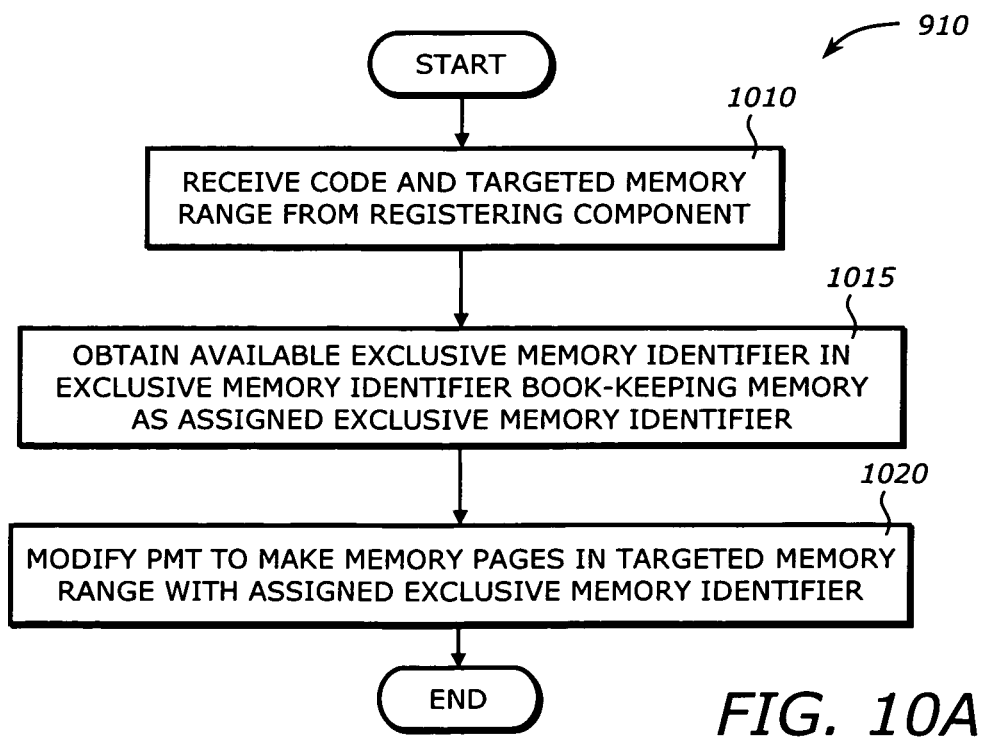
FIG. 10A is a flowchart illustrating a process to assign an exclusive memory identifier according to one embodiment of the invention.

FIG. 10A is a flowchart illustrating the process 910 shown in FIG. 9 to assign an exclusive memory identifier according to one embodiment of the invention.

Upon START, the process 910 receives code and a target memory range from the registering component (Block 1010). Next, the process 910 obtains an available exclusive memory identifier in the exclusive memory identifier book-keeping memory as the assigned exclusive memory identifier (Block 1015). Then, the process 910 modifies the PMT to mark memory pages in the target memory range with the assigned exclusive memory identifier (Block 1020). The process 910 is then terminated.

Figure 10B:
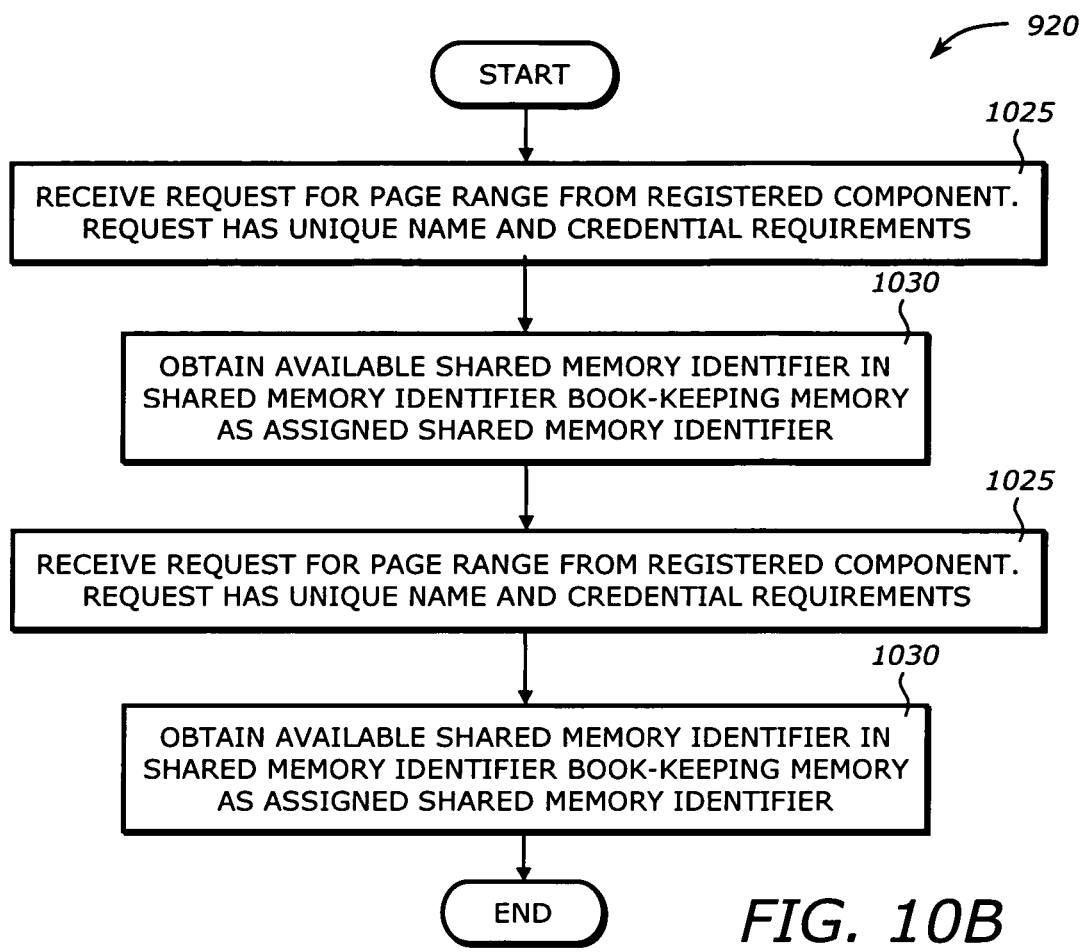
FIG. 10B is a flowchart illustrating a process to assign a shared memory identifier according to one embodiment of the invention.

FIG. 10B is a flowchart illustrating the process 920 shown in FIG. 9 to assign a shared memory identifier according to one embodiment of the invention.

Upon START, the process 920 receives a request for a page range from the registered component, the request having a unique name and credential requirements (Block 1025). Next, the process 920 obtains an available shared memory identifier in the shared memory identifier book-keeping memory as the assigned shared memory identifier (Block 1030). Then, the process 920 adds the registered component to an access control list (ACL) of the assigned shared memory identifier as an owner (Block 1035). Next, the process 920 stores the credential requirements in the shared memory identifiers book-keeping memory (Block 1040). Then, the process 920 modifies the PMT to mark memory pages in the page range with the assigned shared memory identifier (Block 1045). The process 920 is then terminated.

Figure 10C:
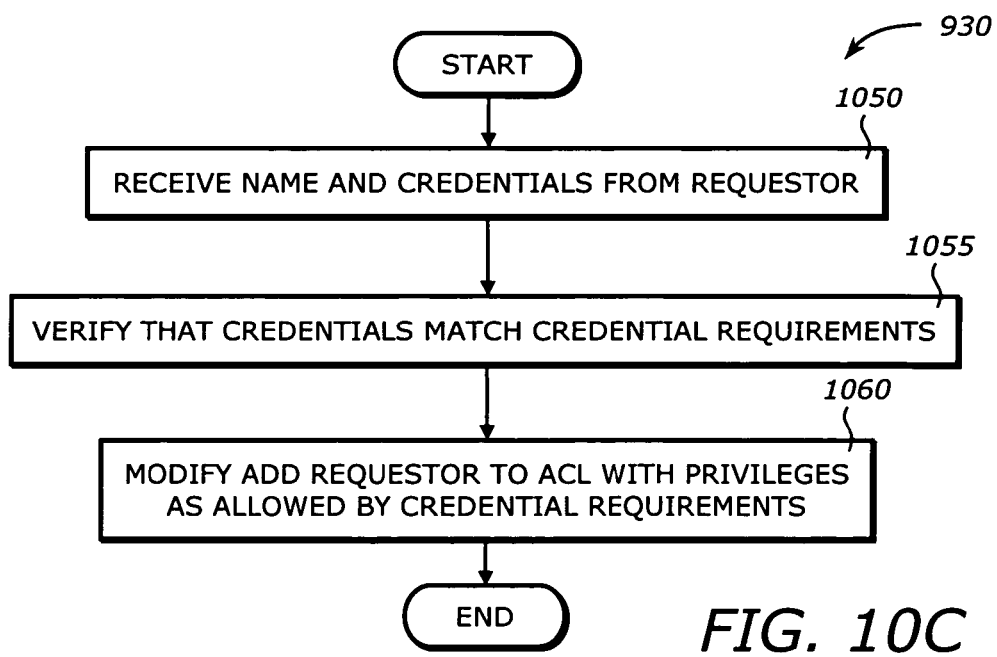
FIG. 10C is a flowchart illustrating a process to process an access request according to one embodiment of the invention.

FIG. 10C is a flowchart illustrating the process 930 shown in FIG. 9 to process an access request according to one embodiment of the invention.

Upon START, the process 930 receives the name and credentials from the requestor (Block 1050). Next, the process 930 verifies that the credentials match the credential requirements (Block 1055). Then, the process 930 adds the requestor to the ACL with privileges as allowed by the credential requirements (Block 1060). The process 930 is then terminated.

Figure 11:
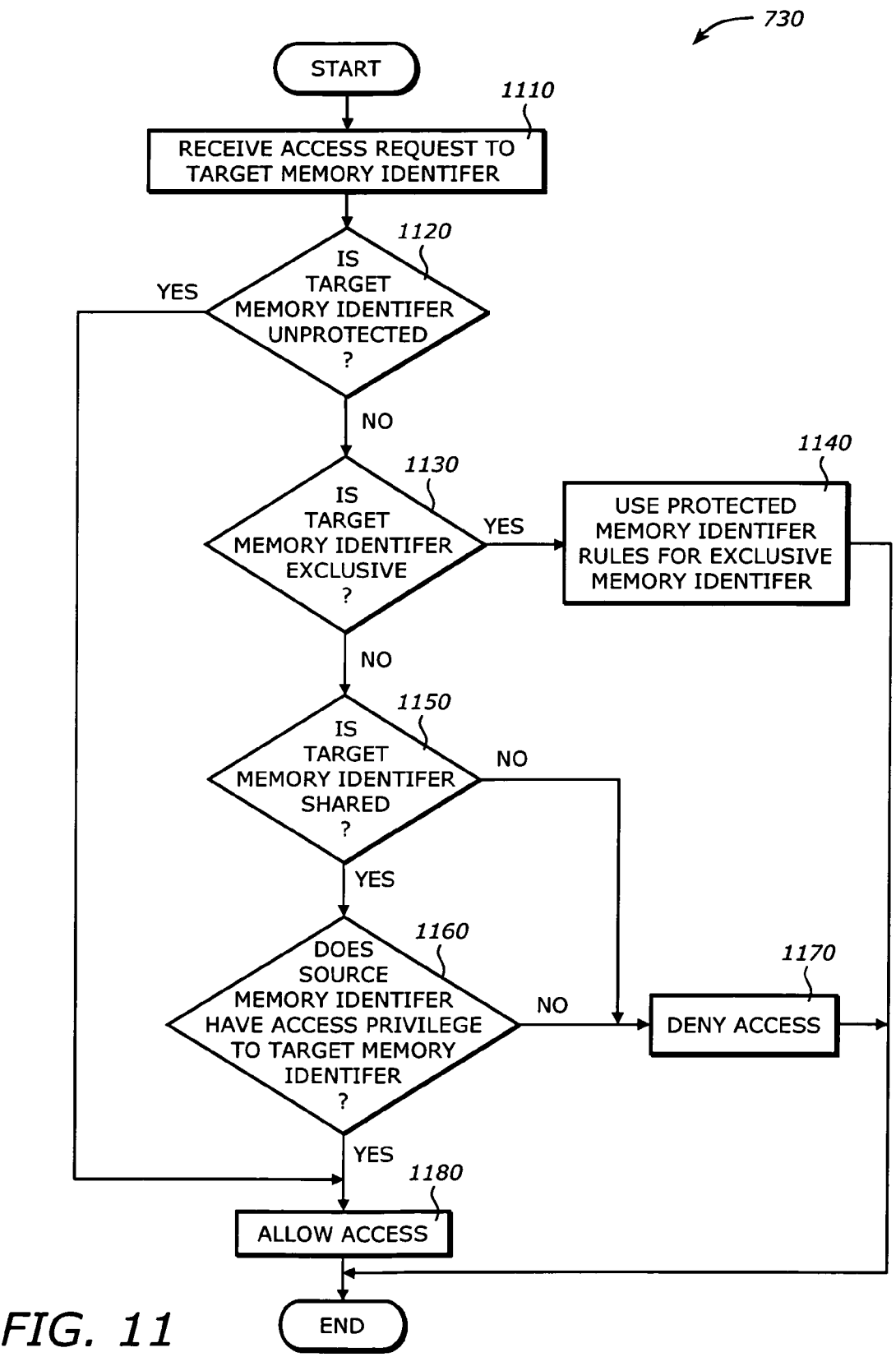
FIG. 11 is a flowchart illustrating a process to enforce an access control policy according to one embodiment of the invention.

FIG. 11 is a flowchart illustrating the process 730 shown in FIG. 7 to enforce an access control policy according to one embodiment of the invention.

Upon START, the process 730 receives an access request to a memory page having a target memory identifier (Block 1110). The access request may be in a form of memory-referencing instructions such as read or write. The access request may come from a memory page that is associated with a source memory identifier. Next, the process 730 determines if the target memory identifier is unprotected, or if it is equal to zero (Block 1120). If so, the process 730 allows access (Block 1180) and is then terminated. Otherwise, the process 730 determines if the target memory identifier an exclusive shared memory identifier (Block 1130). If so, the process 730 uses the protected memory identifier rules for exclusive memory identifiers to determine accessibility (Block 1140) and is then terminated. If the target memory identifier is not an exclusive memory identifier, the process 730 determines if the target memory identifier is a shared memory identifier (Block 1150). If not, the process 730 denies access (Block 1170) and is then terminated. Otherwise, the process 730 determines if the access is allowed or if the source memory identifier has access privilege to the target memory identifier (Block 1160). If not, the process 730 denies access (Block 1170) and is then terminated. Otherwise, the process 730 allows access (Block 1180) and is then terminated.

Figure 12:
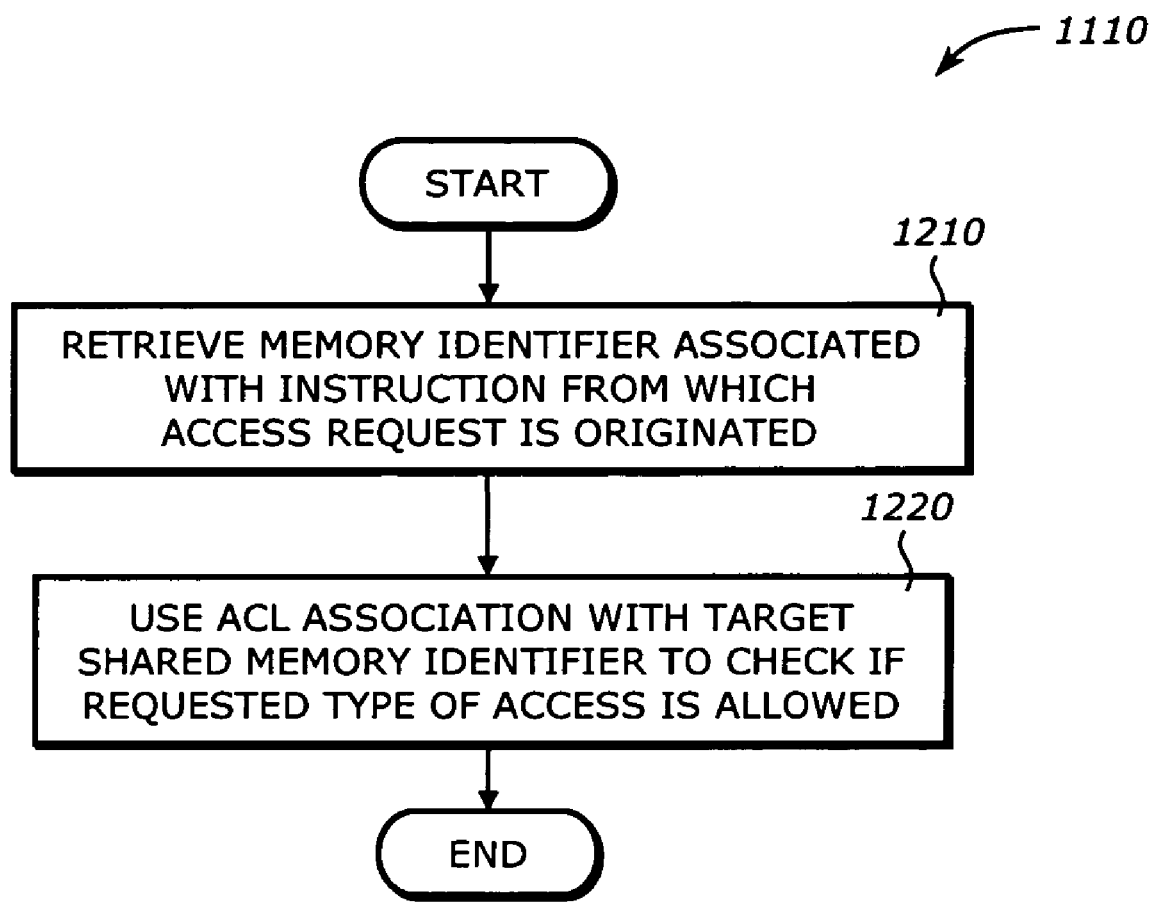
FIG. 12 is a flowchart illustrating a process to determine if an access request is allowed according to one embodiment of the invention.

FIG. 12 is a flowchart illustrating the process 1160 shown in FIG. 11 to determine if an access request is allowed according to one embodiment of the invention.

Upon START, the process 1110 retrieves a memory identifier associated with an instruction from which the access request is originated (Block 1210). This memory identifier may be referred to as a source memory identifier. Next, the process 1110 uses the ACL associated with a target shared memory identifier to check if requested type of access is allowed (Block 1220). This may be performed by matching the source memory identifier with the memory identifiers in the ACL. If there is a match, then the source memory identifier has the access privilege. Otherwise, it does not have the access privilege. The process 1110 is then terminated.

Elements of embodiments of the invention may be implemented by hardware, firmware, software or any combination thereof. The term hardware generally refers to an element having a physical structure such as electronic, electromagnetic, optical, electro-optical, mechanical, electromechanical parts, components, or devices, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), an erasable programmable ROM (EPROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described above. The machine accessible medium may also include program code embedded therein. The program code may include machine readable code to perform the operations described above. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising: a memory identifier storage to store memory identifiers associated with protected components, the memory identifiers including exclusive memory identifiers and shared memory identifiers, the memory identifier storage being protected from access by a host operating system, the memory identifier storage comprising:
   a per-page memory identifier table (PMT) to store memory identifiers associated with physical memory pages,
   an exclusive memory identifier book-keeping memory to maintain state information for each of the exclusive memory identifiers, and
   a shared memory identifier book-keeping memory to store access control information and credential requirements for the shared memory identifiers;
   a memory identifier management service (MMS) coupled to the memory identifier storage to manage the memory identifiers, the MMS residing in a protected environment, the MMS comprising:
   a registration agent to assign an exclusive memory identifier to a registering component and to assign a shared memory identifier to a registered component upon receiving a request having a unique name and credential requirements from the registered component, and
   a shared access processor coupled to the registration agent to process a request from a requestor to access the shared memory identifier using name and credentials provided by the requestor; and
   an access control enforcer (ACE) coupled to the MMS and the memory identifier storage to enforce an access control policy with the memory identifiers.

2. The apparatus of claim 1 wherein the registration agent modifies the PMT to mark memory pages submitted by the registering component with the assigned exclusive memory identifier.

3. The apparatus of claim 1 wherein the registration agent adds the registered component to an access control list (AOL) of the assigned shared memory identifier as an owner, stores the credential requirements in the shared memory identifiers book-keeping memory, and modifies the PMT to mark memory pages submitted by the registered component with the assigned shared memory identifier.

4. The apparatus of claim 3 wherein the shared access processor verifies that the credentials match the credential requirements and adds the requestor to the AOL with privileges as allowed by the credential requirements.

5. The apparatus of claim 4 wherein the ACE determines if an access request to a memory page protected by the shared memory identifier is allowed.

6. The apparatus of claim 5 wherein the ACE retrieves a memory identifier associated with an instruction from which the access request is originated and uses the AOL associated with a target shared memory identifier to check if requested type of access is allowed.

7. The apparatus of claim 3 wherein the credential requirements comprises at least one of an asymmetric key credential, a pointer to a handler, and a hash signature of the critical component.

8. The apparatus of claim 1, wherein the protected environment includes a service processor or a system management mode (SMM) module.

9. The apparatus of claim 1, wherein the ACE is capable of monitoring a memory access.

10. A method comprising: storing memory identifiers associated with protected components in a memory identifier storage, the memory identifiers including exclusive memory identifiers and shared memory identifiers, the memory identifier storage being protected from access by a host operating system, storing the memory identifiers comprising:
  storing memory identifiers associated with physical memory pages in a per-page memory identifier table (PMT),
  maintaining state information for each of the exclusive memory identifiers in an exclusive memory identifier book-keeping memory, and
  storing access control information and credential requirements for the shared memory identifiers in a shared memory identifier book-keeping memory;
managing the memory identifiers using a memory identifier management service (MMS), the MMS residing in a protected environment, managing the memory identifiers comprising:
  assigning an exclusive memory identifier to a registering component,
  assigning a shared memory identifier to a registered component in response to a request having a unique name and credential requirements, and
  processing a request from a requestor to access the shared memory identifier using name and credentials provided by the requestor; and
enforcing an access control policy with the memory identifiers using an access control enforcer (ACE).

11. The method of claim 10 wherein assigning the exclusive memory identifier comprises:
  receiving code and a target memory range from the registering component;
  obtaining an available exclusive memory identifier in the exclusive memory identifier book-keeping memory as the assigned exclusive memory identifier; and
  modifying the PMT to mark memory pages in the target memory range with the assigned exclusive memory identifier.

12. The method of claim 10 wherein assigning the shared memory identifier comprises:
  receiving a request for a page range from the registered component, the request having a unique name and credential requirements;
  obtaining an available shared memory identifier in the shared memory identifier book-keeping memory as the assigned shared memory identifier;
  adding the registered component to an access control list (AOL) of the assigned shared memory identifier as an owner;
  storing the credential requirements in the shared memory identifiers book-keeping memory; and
  modifying the PMT to mark memory pages in the page range with the assigned shared memory identifier.

13. The method of claim 12 wherein processing the request comprises:
  receiving the name and credentials from the requestor;
  verifying that the credentials match the credential requirements; and
  adding the requestor to the AOL with privileges as allowed by the credential requirements.

14. The method of claim 13 wherein enforcing the access control policy comprises:
  determining if an access request to a memory page protected by the shared memory identifier is allowed.

15. The method of claim 14 wherein determining if the access request is allowed comprises:
  retrieving a memory identifier associated with an instruction from which the access request is originated; and
  using the AOL associated with a target shared memory identifier to check if requested type of access is allowed.

16. The method of claim 12 wherein the credential requirements comprises at least one of an asymmetric key credential, a pointer to a handler, and a hash signature of the critical component.

17. The method of claim 10, wherein the protected environment includes a service processor or a system management mode (SMM) module.

18. The method of claim 10, wherein the ACE is capable of monitoring a memory access.

19. A system comprising: a network interface card (NIC) connected to a network to receive and transmit packets, the NIC supporting a full-duplex Gigabit Ethernet interface;
  a processor operating on a platform:
  an input/output controller (IOC) coupled to the processor to establish a connection for packet communication to the network via the NIC;
  a host operating system (OS) running on the platform; and
  a protection structure coupled to the host OS comprising:
    a memory identifier storage to store memory identifiers associated with protected components, the memory identifiers including exclusive memory identifiers and shared memory identifiers, the memory identifier storage being protected from access by the host OS, the memory identifier storage comprising:
      a per-page memory identifier table (PMT) to store memory identifiers associated with physical memory pages,
      an exclusive memory identifier book-keeping memory to maintain state information for each of the exclusive memory identifiers, and
      a shared memory identifier book-keeping memory to store access control information and credential requirements for the shared memory identifiers, a memory identifier management service (MMS) coupled to the memory identifier storage to manage the memory identifiers, the MMS residing in a protected environment, the MMS comprising:
        a registration agent to assign an exclusive memory identifier to a registering component and to assign a shared memory identifier to a registered component upon receiving a request having a unique name and credential requirements from the registered component, and
        a shared access processor coupled to the registration agent to process a request from a requestor to access the shared memory identifier using name and credentials provided by the requestor, and
      an access control enforcer (ACE) coupled to the MMS and the memory identifier storage to enforce an access control policy with the memory identifiers.

20. The system of claim 19 wherein the registration agent modifies the PMT to mark memory pages submitted by the registering component with the assigned exclusive memory identifier.

21. The system of claim 19 wherein the registration agent adds the registered component to an access control list (AOL) of the assigned shared memory identifier as an owner, stores the credential requirements in the shared memory identifiers book-keeping memory, and modifies the PMT to mark memory pages submitted by the registered component with the assigned shared memory identifier.

22. The system of claim 21 wherein the shared access processor verifies that the credentials match the credential requirements and adds the requestor to the ACL with privileges as allowed by the credential requirements.

23. The system of claim 22 wherein the ACE determines if an access request to a memory page protected by the shared memory identifier is allowed.

24. The system of claim 19, wherein the protected environment includes a service processor or a system management mode (SMM) module.

25. The system of claim 19, wherein the ACE is capable of monitoring a memory access.

26. An article of manufacture comprising: a machine-accessible storage medium having data that, when accessed by a machine, cause the machine to perform operations comprising:
storing memory identifiers associated with protected components a memory identifier storage, the memory identifiers including exclusive memory identifiers and shared memory identifiers, the memory identifier storage being protected from access by a host operating system, wherein the data causing the machine to perform storing the memory identifiers comprise data that, when accessed by the machine, cause the machine to perform operations comprising:
storing memory identifiers associated with physical memory pages in a per-page memory identifier table (PMT),
maintaining state information for each of the exclusive memory identifiers in an exclusive memory identifier book-keeping memory,
storing access control information and credential requirements for the shared memory identifiers in a shared memory identifier book-keeping memory;
managing the memory identifiers using a memory identifier management service (MMS), the MMS residing in a protected environment, wherein the data causing the machine to perform managing the memory identifiers comprise data that, when accessed by the machine, cause the machine to perform operations comprising:
assigning an exclusive memory identifier to a registering component,
assigning a shared memory identifier to a registered component in response to a request having a unique name and credential requirements,
processing a request from a requestor to access the shared memory identifier using name and credentials provided by the requestor; and
enforcing an access control policy with the memory identifiers using an access control enforcer (ACE).

27. The article of manufacture of claim 26 wherein the data causing the machine to perform enforcing the access control policy comprises data that, when accessed by a machine, cause the machine to perform operations comprising:
determining if an access request to a memory page protected by the shared memory identifier is allowed.

28. The article of manufacture of claim 27 wherein the data causing the machine to perform determining if an access request is allowed comprises data that, when accessed by a machine, cause the machine to perform operations comprising:
retrieving a memory identifier associated with an instruction from which the access request is originated; and
using an access control list (ACL) associated with a target shared memory identifier to check if requested type of access is allowed.

29. The article of manufacture of claim 26, wherein the protected environment includes a service processor or a system management mode (SMM) module.

30. The article of manufacture of claim 26, wherein the ACE is capable of monitoring a memory access.

* * * * *

UNITED STATES PATENT AND TRADEMARK OFFICE
CERTIFICATE OF CORRECTION

PATENT NO. : 7,624,242 B2
APPLICATION NO. : 11/394844
DATED : November 24, 2009
INVENTOR(S) : Savagaonkar et al.

It is certified that error appears in the above-identified patent and that said Letters Patent is hereby corrected as shown below:

In column 12, at line 41, delete "(AOL)" and insert -- (ACL) --.

In column 12, at line 49, delete "AOL" and insert -- ACL --.

In column 12, at line 56, delete "AOL" and insert -- ACL --.

In column 13, at line 49, delete "(AOL)" and insert -- (ACL) --.

In column 13, at line 60, delete "AOL" and insert -- ACL --.

In column 14, at line 3, delete "AOL" and insert -- ACL --.

In column 14, at line 58, delete "(AOL)" and insert -- (ACL) --.

Signed and Sealed this

Sixth Day of April, 2010

David J. Kappos
*Director of the United States Patent and Trademark Office*